UNITED STATES PATENT OFFICE.

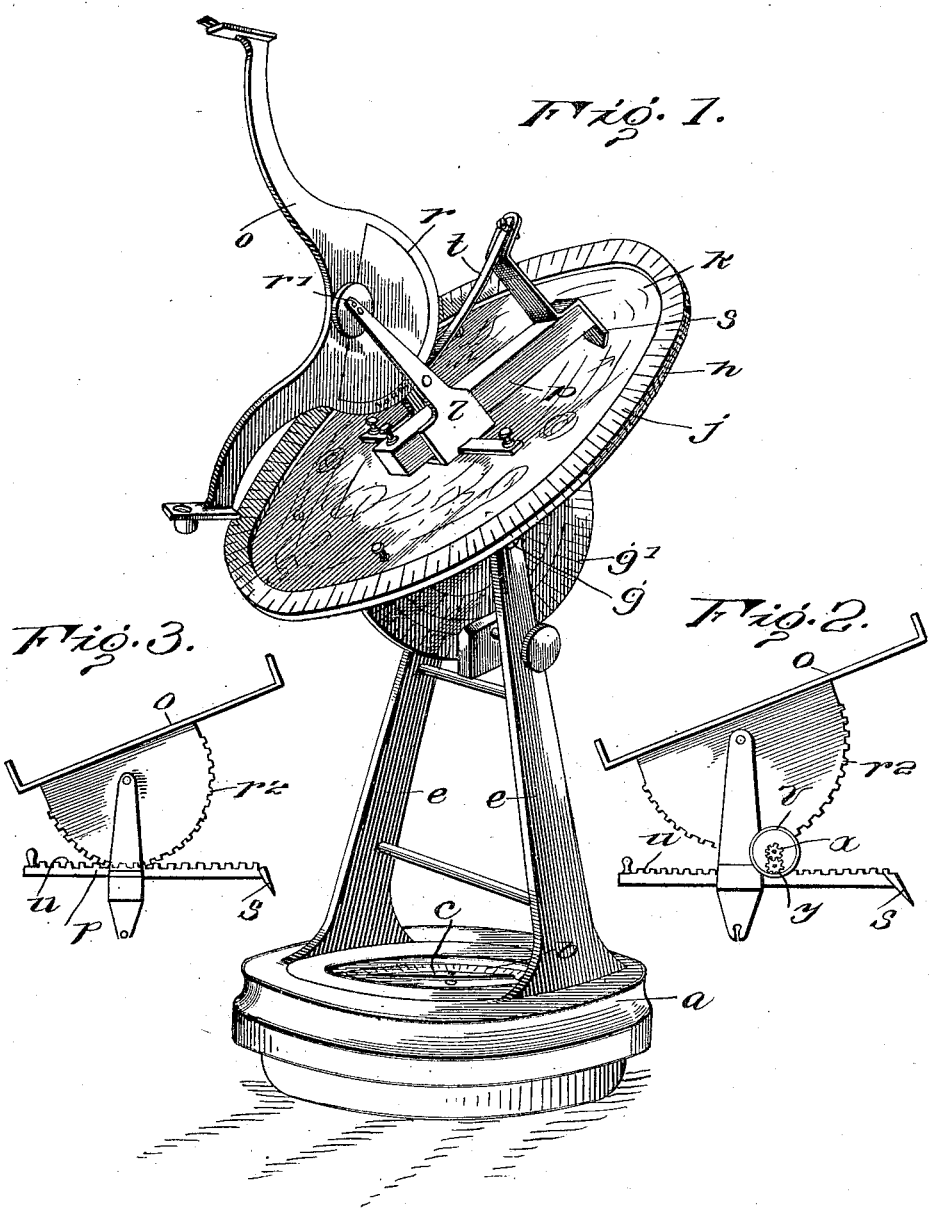

WILLIAM PECK, OF EDINBURGH, SCOTLAND.

ASTRONOMICAL INSTRUMENT FOR INDICATING POSITIONS OF CELESTIAL OBJECTS.

1,130,625. Specification of Letters Patent. Patented Mar. 2, 1915.

Application filed November 1, 1913. Serial No. 798,760.

*To all whom it may concern:*

Be it known that I, WILLIAM PECK, a subject of His Majesty the King of England, residing at Edinburgh, in the county of Edinburgh, Scotland, have invented certain new and useful Improvements in Astronomical Instruments for Indicating Positions of Celestial Objects, of which the following is a specification.

This invention has for its object to provide a simple, universal, and automatic instrument, for readily determining the apparent positions of celestial objects, and identifying them in all latitudes, and in both northern and southern hemispheres.

The instrument consists of the following parts:—A base, or stand, which contains a magnetic compass needle, with angular graduations to allow an adjustment to be made for magnetic declination, in order to bring the meridian line of the instrument into a coincidence with the meridian of the place of observation. A movable plane, with an angular adjustment for northern and southern latitudes. A rotatable disk, containing a projection, or development, of the celestial sphere on a new method, by which an indicator can be used to point from an object depicted on the map to the corresponding object in the heavens. An equatorial horizon, containing the hours from noon, and midnight, for both hemispheres. A compound movable indicator, with, or without, telescopic sights, which automatically points from the celestial object indicated on the map, directly to the corresponding object in the heavens, without reference to tables of coördinates, or position lines of right ascension and declination, and without the use of graduated circles of right ascension and declination.

I will now describe an instrument constructed with my invention with reference to the accompanying drawings in which:—

Figure 1 is a perspective view of an instrument constructed according to my invention, and Figs. 2 and 3 are detail diagrammatic views of modifications of a portion of my improved device.

Referring now to the drawings in which like reference numerals designate similar parts, the base of the instrument is indicated by the reference numeral $a$. Within the base a magnetic needle $b$ is pivoted above a card $c$ which is graduated to degrees and minutes for the angular adjustment of magnetic declination from the meridian. Extending up from a base $a$ are two upright parallel pillars $e$ $e$ spaced apart by suitable braces. The said pillars carry an axis $g$ around which a semi-circular disk $g'$ pivots. This semi-circular disk $g'$ is marked so as to show angles of latitude for the southern, "S," and northern, "N" hemispheres. The semi-circular disk $g'$ supports an equatorial horizon plane $h$. The circumference $j$ of this plane is graduated into hours and minutes for local time for both northern and southern hemispheres.

Within the horizon plane $h$ and concentric with it is a movable planisphere $k$ which is revoluble around the center $l$. This planisphere $k$ is a view or map of the heavens, constructed on a specially designed projection or development, of the celestial sphere, whereby angular distances on the map correspond with lateral, and vertical angular distances on the star sphere. This planisphere $k$ is moved by means of a suitable handle carried thereby. Mounted on the center $l$ and revoluble thereon is a compound automatic indicator $o$ $p$ which carries a semi-circular disk $r$ which is movable around an axis $r'$. This compound indicator is provided at one end with a pointer $s$ which is adapted to be moved to and from the circumference of the planisphere $k$ and pointed to any object depicted thereon at which time the indicator $o$ which may be provided with telescopic sights, automatically points to the corresponding object in the heavens. The map $k$ carried on the horizon plane $h$ is movable around the center $l$ for the purpose of being adjusted to the graduations on the circumference $j$ which graduations, as above stated, show hours and minutes of local time for both northern and southern hemispheres. Once this adjustment is made, however, the horizon plate $h$ together with the map $k$ only tilt on the axis $g$ for parallel adjustment to the equatorial plane.

The automatic pointing from the map to the celestial sphere, is accomplished by a flexible band $t$ which automatically controls the movement of the indicator $o$ when the pointer $s$ is adjusted on the map. Instead of the band $t$, a rack and pinion arrangement may be employed as in Fig. 2, where $u$ is the rack carrying the pointer $s$, and $v$ the button head for revolving the pinions $x$ $y$; or a rack and toothed wheel may be adopted, as shown in Fig. 3, where $u$ is the rack carrying the pointer $s$, as before, and $r^2$ the toothed wheel carrying the indicator $o$.

The operation of my device is as follows: If it is desired to identify a certain star, the apparatus must be placed so as to bring the meridian line of the instrument into a coincidence with the meridian line of the place of observation, and for this purpose a magnetic contact needle is contained in the base or stand of the instrument with angular graduations to allow an adjustment to be made for magnetic declination. The horizon plane $h$ is then brought in a parallel position to the equatorial plane, which adjustment is for each latitude easily and accurately obtained by means of the semicircular disk $g'$, having the degrees of latitude (for the northern and southern hemispheres) graduated at the circumference, and pivoting around axis $g$. The pointer $s$ is then brought to that point of the celestial map, placed in the planisphere $k$ within the circumference $j$, which represents the position of the respective star on this map. By moving the pointer $s$ horizontally, the indicator $o$ is correspondingly displaced in a horizontal angle, as the pointer $s$ and the indicator $o$ turn horizontally around the same axis $l$. When the pointer $s$ is moved toward, or away from the circumference $j$, a corresponding displacement, in a vertical angle, of the indicator $o$ is effected by means of a band $t$ winding up on a semi-circular disk $r$ pivoting around the axis $r$. The displacement of the pointer $s$ to or from the horizon ring $j$ and the corresponding displacement of the indicator $o$ in vertical angle, may also be effected by means of a rack and gear, as shown in Fig. 2, which are made to gear into the appropriately toothed periphery of the semi-circular disk $r^2$.

What I claim as my invention and desire to secure by Letters Patent of the United States is:—

1. An instrument for directly indicating the direction of celestial objects in both hemispheres comprising a planisphere, a support therefor, the said planisphere including a horizon plate provided with a map of the heavens, a pointer support centrally mounted over the said horizon plate, said support having a lateral guide, a pointer mounted in the lateral guide, whereby the pointer may be moved radially and laterally over the map, an indicator and means between the pointer and the indicator to cause the latter to be correspondingly moved by and with the pointer.

2. An instrument for directly indicating the directions of celestial objects in both hemispheres comprising a base, a graduated card and a magnetic needle mounted thereon, a support extending upwardly from the base, a rotatable planisphere pivoted on the support and including a horizon plate having a map of the heavens, and a compound indicator and pointer mounted upon the said planisphere and adapted when pointed to any object depicted upon the said map to automatically point to the corresponding object in the heavens.

3. An instrument for directly indicating the directions of celestial bodies in both hemispheres comprising in combination a base, a graduated card and magnetic needle mounted thereon, pillars carried by the said base, a semicircular disk pivotally mounted between the said pillars and provided with indications of latitude for the northern and southern hemispheres, a planisphere and equatorial horizon plate pivotally mounted on said disk, and an indicator and a radially movable pointer rotatably mounted upon said plate, the movement of the said indicator automatically corresponding with true vertical and lateral angular movements on the planisphere.

4. An instrument for directly indicating the directions of celestial bodies in both hemispheres comprising in combination a base, a graduated card and magnetic needle mounted thereon, pillars on said base, a semicircular disk pivotally mounted between said pillars and provided with indications of latitude for the northern and southern hemispheres, a planisphere and equatorial horizon plate pivotally mounted on the said disk, a map carried by the plate, a centrally pivoted support above the horizon plate, a radially slidable pointer mounted on the support and coöperating with the map, a celestial indicator having a semicircular disk pivoted on said support, and means for interconnecting the indicator and the pointer substantially as described.

In testimony whereof I have signed this specification in the presence of two subscribing witnesses.

WILLIAM PECK.

Witnesses:
K. M. SIMPSON,
FREDERICK PIATT.

Copies of this patent may be obtained for five cents each, by addressing the "Commissioner of Patents, Washington, D. C."